Patented Sept. 1, 1925.

1,551,550

UNITED STATES PATENT OFFICE.

GEORGE W. FREIBERG, OF TERRE HAUTE, INDIANA, ASSIGNOR TO COMMERCIAL SOL-VENTS CORPORATION, OF TERRE HAUTE, INDIANA, A CORPORATION OF MARY-LAND.

FERMENTATION PROCESS FOR PRODUCING ACETONE AND BUTYL ALCOHOL.

No Drawing. Application filed October 31, 1922. Serial No. 598,119.

*To all whom it may concern:*

Be it known that I, GEORGE W. FREIBERG, a citizen of the United States, and a resident of the city of Terre Haute, in the county of Vigo and State of Indiana, have invented certain new and useful Improvements in Fermentation Processes for Producing Acetone and Butyl Alcohol, of which the following is a specification.

My invention relates more particularly to the industrial production of acetone and butyl alcohol by fermentation, and has special reference to processes of this kind in which the active fermentation is influenced or affected by temperature control to produce requisite yields of these products.

The production of acetone and butyl alcohol jointly by fermentation is old and commonly practiced, but in such processes as hitherto proposed and with which I am familiar, certain disadvantages have developed which have rendered difficult their practice on a commercial scale. For example, considerable difficulty is encountered, when attempting fermentation on a large industrial scale, due to the tendency of the mash toward acid fermentation, which in itself frequently results in inhibiting the proper growth of the acetone-butyl alcohol bacteria whereby a partial or total loss of much valuable fermentable raw material in the mash occurs.

Acetone-butyl alcohol forming bacteria are capable of fermenting suitably prepared mashes formed from such carbohydrates as are usually found in cereals, for example, maize, rice, wheat, rye, dari, etc., and also from sugar carbohydrates, or from mixtures of these cereal and sugar carbohydrates, with or without the addition of suitable nutrient materials or stimulants.

Under ideal conditions, 98° F. is the optimum temperature for successful fermentation of such carbohydrates on an industrial scale by acetone-butyl alcohol bacteria, for instance, that described in the U. S. Weizmann Patent No. 1,315,585 of September 9, 1919, in which the cooled sterilized maize mash is inoculated with the final culture of Weizmann's heat resisting bacteria at about 95 to 97° F., and the fermentation proceeds substantially as described in this patent.

A tendency toward deleterious acid fermentation in the fermenter tanks or containers may manifest itself in any or all of the following ways:

(1) Abnormal rise in the acidity of the mash.

(2) Decrease in the rate of gas evolution.

(3) An odor characteristic of the stoppage of acetone-butyl alcohol formation and of a tendency toward undesirable acid fermentation.

(4) A tendency developed in the fermentable mash toward settling of the solid constituents while leaving a clear supernatant liquid showing a segregation of the mash.

I have observed that if the temperature in the fermenters in large industrial runs is appreciably lowered below 98° F., the fermentation is slower. But I have discovered that whenever a tendency toward deleterious acid fermentation is detected by any one or more of these heretofore designated adverse conditions in the fermenter, the normal acetone-butyl alcohol fermentation, which, according to the Weizmann Patent No. 1,315,585 should proceed vigorously for about 36 hours with a copious evolution of gas indicating active fermentation, may be restored nearly or entirely to its normal course by promptly and evenly lowering the temperature of the mash to a point at which acidity, rate of gas evolution, characteristic odor of acetone and butyl alcohol fermentation, and appearance indicate the resumption of normal active fermentation.

The best results I have discovered are usually obtained by rapidly and evenly reducing the temperature of the fermenting mash to about 88°–92° F., but slightly higher (95° F.) temperatures and slightly lower (85° F.) temperatures may also be successfully used to attain the desired results. The requisite cooling of the mash may be accomplished by any of the usual methods, for example by means of coils or pipes in the fermenter equipped with the usual stirrers, through which coils or pipes streams of cooling liquid are passed until the temperature of the mash is reduced to a point where vigorous acetone-butyl alcohol fermentation is restored as evidenced by the characteristics hereinbefore noted.

Such cooling of the mash may also be effected by external means such as spraying cold liquid on the exterior surfaces, or jacketing the fermenter with annular reservoirs for cool liquid. As hereinbefore mentioned, it is necessary that the temperature of the mash in the fermenter tending toward undue acid fermentation should be reduced as rapidly as possible and also evenly throughout the mash solution.

In carrying out the fermentation processes, should the fermentation develop any of the indicia hereinbefore set forth evidencing a tendency toward acid fermentation, then the temperature of the mash should be rapidly and evenly reduced. Such temperature reduction may tend to slow down the desirable acetone-butyl alcohol fermentation, but at the same time it successfully inhibits a further development or tendency of the mash toward deleterious acid fermentation.

It is understood that various changes may be made in the details of my processes whereby the rapid cooling of the fermenting mash may be attained evenly throughout the mass without departing from the spirit and scope of my invention.

I claim as my invention:

1. In the process of fermenting a carbohydrate mash with bacteria capable of producing acetone and butyl alcohol at a temperature of about 98° F., the step which comprises lowering the temperature of the mash, when showing a tendency toward acid fermentation, to between 85° and 95° F. to restore or maintain active acetone and butyl alcohol fermentation thereof.

2. In the process of fermenting a carbohydrate mash with bacteria capable of producing acetone and butyl alcohol at a temperature of about 98° F., the step which comprises lowering the temperature of the mash, when showing a tendency toward acid fermentation, to between 88° and 92° F. to restore or maintain active acetone and butyl alcohol fermentation thereof.

3. In the process of fermenting a carbohydrate mash with bacteria capable of producing acetone and butyl alcohol at a temperature of about 98° F., the step which comprises rapidly lowering the temperature of the mash, when showing excessive acid fermentation, to between 85° and 95° F. to restore or maintain active acetone and butyl alcohol fermentation thereof.

4. In the process of fermenting a carbohydrate mash with bacteria capable of producing acetone and butyl alcohol at a temperature of about 98° F., the step which comprises rapidly lowering the temperature of the mash, when showing excessive acid fermentation, to between 88° and 92° F. to restore or maintain active acetone and butyl alcohol fermentation thereof.

5. In the process of fermenting a carbohydrate mash with bacteria capable of producing acetone and butyl alcohol at a temperature of about 98° F., the step which comprises rapidly and evenly lowering the temperature of the mash, when showing excessive acid fermentation, to between 85° and 95° F. to restore or maintain active acetone and butyl alcohol fermentation thereof.

6. In the process of fermenting a carbohydrate mash with bacteria capable of producing acetone and butyl alcohol at a temperature of about 98° F., the step which comprises rapidly and evenly lowering the temperature of the mash, when showing excessive acid fermentation, to between 88° and 92° F. to restore or maintain active acetone and butyl alcohol fermentation thereof.

GEORGE W. FREIBERG.